(12) United States Patent
Franz et al.

(10) Patent No.: US 6,437,323 B1
(45) Date of Patent: Aug. 20, 2002

(54) OPTOELECTRONIC PATH-, ANGLE- OR ROTATION-MEASURING DEVICE

(75) Inventors: Heinz-Günther Franz, Hamburg; Wolfgang Holzapfel, Obing, both of (DE)

(73) Assignee: Dr. Johannes Heidenhain G.mbH, Traunreut (DE)

(*) Notice: Subject to any disclaimer, the term of this patent is extended or adjusted under 35 U.S.C. 154(b) by 0 days.

(21) Appl. No.: 09/601,856

(22) PCT Filed: Feb. 9, 1999

(86) PCT No.: PCT/EP99/00838
§ 371 (c)(1),
(2), (4) Date: Oct. 13, 2000

(87) PCT Pub. No.: WO99/41570
PCT Pub. Date: Aug. 19, 1999

(30) Foreign Application Priority Data

Feb. 10, 1998 (DE) .......................... 198 05 309

(51) Int. Cl.⁷ .............................. G01D 5/347
(52) U.S. Cl. ...................... 250/231.13; 250/231.14; 250/237 G
(58) Field of Search .............. 250/237 G, 231.13, 250/231.14, 231.15, 231.16, 231.17, 231.18; 356/499, 498; 359/566

(56) References Cited

U.S. PATENT DOCUMENTS 5,155,355 A * 10/1992 Kabaya ................. 250/214 PR
5,377,044 A * 12/1994 Tomono et al. ........ 250/231.16
5,680,211 A * 10/1997 Kaneda et al. ......... 250/231.17

FOREIGN PATENT DOCUMENTS

| DE | 37 38 977 | 2/1989 |
| DE | 195 27 287 | 1/1997 |
| DE | 296 09 523 | 11/1997 |
| EP | 0 564 683 | 10/1993 |
| JP | 600 40 903 | 3/1985 |
| JP | 9-0133 221 | 2/1997 |

* cited by examiner

*Primary Examiner*—Stephone Allen
(74) *Attorney, Agent, or Firm*—Kenyon & Kenyon

(57) ABSTRACT

An opto-electronic linear, angular, or rotary position encoder is described. The device includes a light modulating code carrier comprising at least one coded track having adjacent light projecting and light non-projecting portions and an aperture structure disposed in a path of light being modulated by the code carrier. The device further includes a transparent substrate supporting at least one opto-electronic sensor chip facing the aperture structure, wherein the aperture structure is disposed on an aperture platelet, and the aperture platelet is joined to the substrate.

16 Claims, 3 Drawing Sheets

OPTOELECTRONIC PATH-, ANGLE- OR ROTATION-MEASURING DEVICE

DESCRIPTION OF RELATED ART

In optoelectronic linear, angular, or rotary position encoders, at least one coded track of a code carrier or encoder is typically illuminated, and a sensor measures the change in intensity of the light through the coded track in response to a movement of the code carrier. In a method using transmitted light, a light source is configured so that its light beam is transmitted through a transparent code carrier, whose light and dark sections are formed by regions with varying transparency. In a method using an incident-light, or vertical illumination principle, a coded track is illuminated, whose light and dark fields are formed by areas that reflect the light to a greater or lesser degree.

A very fine division of the coded track into light and dark graduation fields necessitates a slit aperture that is subdivided into transparent light-transmitting regions of varying transparency, in accordance with the light and dark fields of the coded track. This means that the maximum quantity of light is transmitted through only when the coded track and slit aperture are coincidently positioned. As a result, an optoelectronic sensor, which is positioned on the side of the assembly that is remote from the light source, receives a fully modulated light signal. Assigned to each coded track is a photosensor, which receives the transmitted light signal.

A separate photoelectronic component can be allocated to each coded track. This is also the case in opto-arrays, which combine a plurality of photosensors into one component. However, in this case, it is difficult to precisely align the aperture to the photoelectronic component with the code carrier.

An optoelectronic linear, angular, or rotary position encoder is proposed in EP 0 564 683 A1. An optoelectronic sensor is configured on the side of a plate-shaped aperture stop remote from the encoder. The sensor has contact points that face the plate-shaped aperture stop, and contact the electrical printed conductors on one side of the plate-shaped aperture stop. The aperture structure can be formed in a coating of the plate-shaped aperture stop.

This structure requires substantial effort and cost for manufacturing. The aperture structure can become damaged when mounting the semiconductor chip on the plate-shaped aperture stop. If an application requires a different aperture structure, it is necessary to fabricate a completely new plate-shaped aperture stop.

In addition to providing an aperture structure in front of light-sensitive sensor surfaces of optoelectronic sensors, certain optical scanning devices also use an aperture structure placed in front of the light source in question. In such a decision, it may be necessary to use emitter gratings, for example, like the ones in an arrangement described in German Patent DE 195 27 287. In a design using emitter gratings, the cost and inflexibility discussed above are also a factor when manufacturing the unit.

SUMMARY OF THE INVENTION

The embodiments of the present invention are directed to optoelectronic linear, angular, or rotary position encoders, particularly in view of simplifying the implementation of various aperture structures. The optoelectronic linear, angular, or rotary position encoder can have an illuminated or transilluminated code carrier, which can include at least one coded track having either alternating reflecting and non-reflecting zones, or transparent and opaque zones defining light and dark fields. Different configurations can thus be used to provide alternating light projecting zones and light non-projecting zones.

Artificial light, and even daylight, can be used as a light source. In addition, the device can include an aperture platelet, which is disposed in the path of the light modulated by the code carrier. The aperture platelet has an aperture structure with regions that are transparent to a greater or lesser extent, corresponding to the light and dark fields of the coded track, and which is joined to a transparent substrate that supports at least one optoelectronic sensor chip facing the aperture structure.

In one aspect, the invention is thus an opto-electronic linear, angular, or rotary position encoder is described. The device includes a light modulating code carrier comprising at least one coded track having adjacent light projecting and light non-projecting portions and an aperture structure disposed in a path of light being modulated by the code carrier. The device further includes a transparent substrate supporting at least one opto-electronic sensor chip facing the aperture structure, wherein the aperture structure is disposed on an aperture platelet, and the aperture platelet is joined to the substrate.

In one embodiment of the invention, the aperture structure is arranged only in front of the optoelectronic sensor chip. Alternative embodiments in accordance with the present invention can provide also for configuring an aperture structure formed by an emitter grating disposed in front of the light-emitting surface of a suitable light source.

The aperture platelet, which is preferably a glass wafer that can have a coating, scribe line or embossing forming the aperture structure, can be manufactured separately. Different applications thus only require producing different aperture platelets. On the other hand, the transparent substrate, together with the sensor chip mounted thereon, forms an assembled structure that can be produced without changes for a plurality of application cases. Thus, the aperture platelet and assembled structure can serve as a model for various applications, in the manner of a unit construction system.

The transparent substrate can be provided with printed conductors, to connect the chip at its contact points to the printed conductors using a "flip-chip assembly" method. The transparent substrate can be glass, plastic, or another suitable material. In the first case, the chip assembly can also be referred to as "chip-on-glass assembly". In addition, the chip can be protected on the substrate by encapsulating material. The aperture platelet can preferably have at least one projection beyond the transparent substrate with edges defined with respect to the aperture structure, making it possible to precisely align the aperture structure.

The aperture platelet can be joined to the transparent substrate by bonding or by using other interconnect technologies. Also, an interconnect technology can be used which makes it possible to replace the aperture platelet in a later step.

BRIEF DESCRIPTION OF THE DRAWINGS

The present invention is explained in the following detailed description of exemplary embodiments, with reference to the attached drawings.

In the Drawings.

DETAILED DESCRIPTION OF EMBODIMENTS OF THE INVENTION

Figure 1:
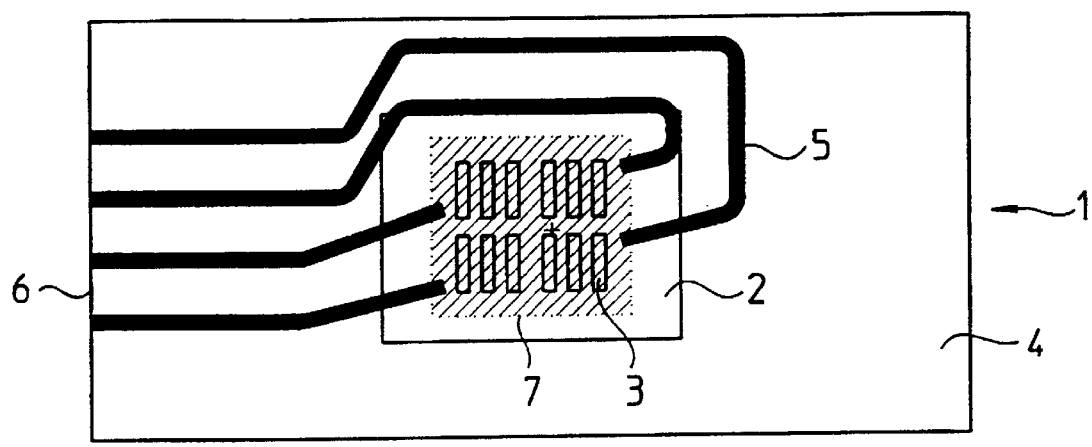
FIG. 1 is a plan view showing an aperture platelet for a linear encoder on a component, including a flip-chip assembly.

In the following description of various exemplary embodiments, identical elements are denoted by the same reference numerals. The corresponding description applies for all designs which use the same reference numerals.

Figure 2:
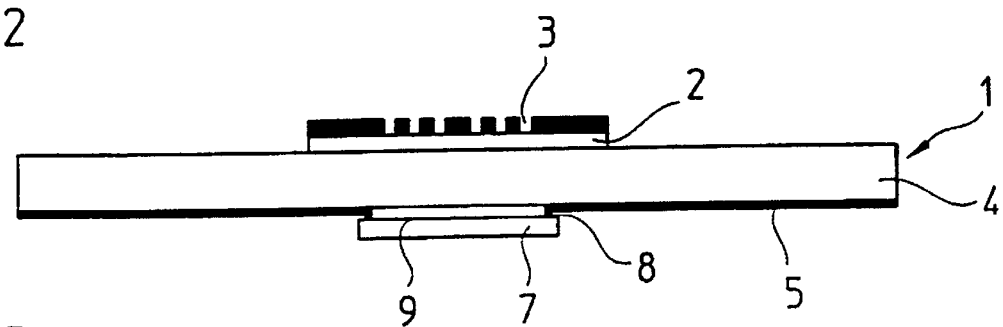
FIG. 2 is a cross-sectional view showing an embodiment related to the embodiment shown in FIG. 1.

Component 1 illustrated in FIGS. 1 and 2 has an aperture platelet 2, which includes an aperture structure 3 situated above one surface. In this description, "above" and "below" refer to the orientation as shown in the examples in the drawings. In the depicted exemplary embodiment, aperture structure 3 is formed by a substantially opaque layer, for example a layer of chrome, which has slot-shaped interruptions that form transparent light-transmitting regions. In this exemplary embodiment, aperture structure 3 is formed purely as an amplitude grating. Also in this example, aperture structure 3 has four groups, each with three slots.

In alternative embodiments, the aperture structure 3 can be other than a pure amplitude grating, and other configurations can also be used, depending upon the demands of the optical scanning device. Thus, for instance, aperture structure 3 can also include a known transmission phase grating or, alternatively, a combination of an amplitude grating and a phase grating. The latter can be formed, for example, by integrating specific phase-grating substructures having defined phase-shifting effects into the transparent light-transmitting openings in an amplitude grating superlattice.

In embodiments where a phase grating is used, in addition to the particular scale graduation, the phase shift $\Delta\phi$ can also be specifically adjusted while remaining within the optical scanning principle of the invention. Thus, it is possible, for example, to select a phase shift of $\Delta\phi=90°$, $\Delta\phi=180°$, or other values.

In another alternative embodiment to the aperture platelet shown in FIGS. 1 and 2, it is possible to not arrange the aperture structure 3 on the top side of the aperture platelet, but rather to arrange it on its bottom side, i.e., on that side which faces substrate 4. This ensures an improved protection of the aperture structure 3 from possible mechanical influences, for example from damage caused by an oppositely situated code carrier in an arrangement similar to that shown in FIG. 3.

Component 1 can have a plate-shaped transparent substrate 4, which is preferably made of plastic, glass, or of other suitable materials, and is coated underneath with printed conductors 5. Printed conductors 5 can be routed to an edge 6 of substrate 4, where they can be contacted. Their inner ends can be assigned to the contact points of an optoelectronic chip 7. Using different interconnect technologies, such as gold bumps 8, chip 7 is secured to the inner ends of printed conductors 5 and electro-conductively connected thereto. In this example, the four light-sensitive sensor surfaces 9 of the optoelectronic sensor chip are directed upwards, i.e., toward substrate 4.

Substrate 4 can be joined at the top to aperture platelet 2, for example by bonding. In this example, each of the four slot groups of substrate 4 is assigned to a light-sensitive sensor surface 9, i.e., to a vertical line through this surface.

In another exemplary embodiment, in addition to the variant depicted in FIGS. 1 and 2, provision can be made to arrange the optical elements in a substrate made of a suitable plastic material. These optical elements can be, for example, one or a plurality of collimator lenses, which are arranged or integrated in substrate 4 between aperture platelet 2 and light-sensitive sensor surfaces 9, and are used to focus the incident rays striking light-sensitive sensor surfaces 9 from above. The optical elements thus integrated in substrate 4 are protected in this manner from mechanical influences.

Figure 3:
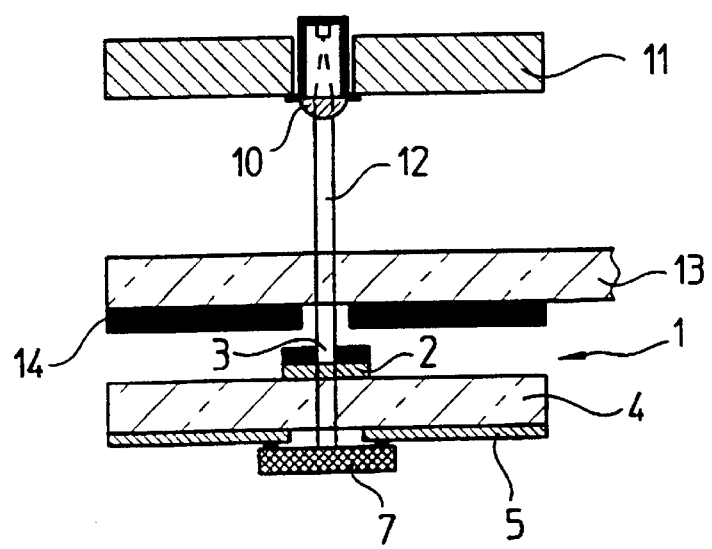
FIG. 3 is a cross sectional view showing a corresponding arrangement of the embodiment in a linear encoder.

In accordance with the embodiment shown in FIG. 3, the linear encoder includes a light transmitter 10, which is retained in a carrier 11, such that its beam of light 12 is aligned in a direction normal to aperture structure 3 and to the assigned light-sensitive surface of sensor chip 7. Disposed between light transmitter 10 and component 1 is a transparent code carrier 13, that can include a glass plate supporting a coded track 14 having light and dark fields. The fields can be transparent and opaque regions, which correspond to aperture structure 3. Coded track 14 can be arranged in such a way that it traverses light beam 12, in a direction normal thereto in response to a movement of transmission code carrier 13, and modulates the light and dark fields of the code carrier 13. In cooperation with aperture platelet 2, optoelectronic sensor chip 7 can thus supply a fully modulated signal.

In the exemplary embodiment of FIGS. 1 and 2, aperture platelet 2 or aperture structure 3 can be arranged in front of light-sensitive surface 9 of sensor chip 7, so that aperture structure 3 functions as a scan grating. As already indicated above, in a fully equivalent manner, an aperture structure 3 of this kind can also be arranged as an emitter grating in front of the light-emitting surface of a corresponding light source or of a light transmitter, such as in front of an LED.

An arrangement of this kind can be useful, for example, when working with incident-light systems, where both the light source and the light-sensitive sensor chips are disposed on one side with respect to the particular reflection code carrier. In this case the corresponding reflection code carrier can be made from a periodic arrangement of light and dark fields, forming reflecting and non-reflecting regions.

Figure 4:
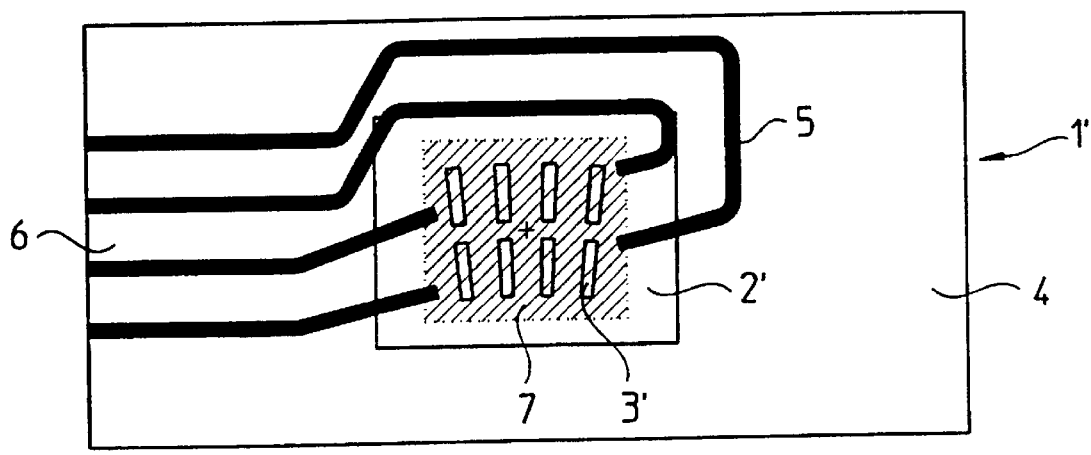
FIG. 4 is a plan view showing an aperture platelet for an angular or rotary encoder in a component, including a flip-chip assembly.
Figure 5:
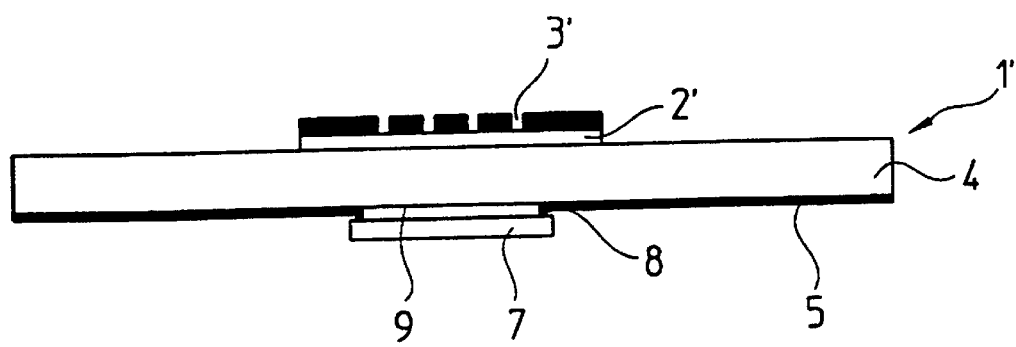
FIG. 5 is a cross-sectional view of the embodiment of FIG. 4.

Component 1' shown in FIGS. 4 in 5 can be distinguished from the component of the previous embodiment by the configuration of aperture structure 3 of aperture platelet 2. This configuration can include slots, which are aligned to an axis of rotation, to facilitate application in either an angular or rotary encoder. However, the same flip-chip assembly 4, 5, 7, 8 can be used as in the preceding exemplary embodiment.

Component 1' can be used in an arrangement similar to that of FIG. 3. However, the translationally moving code carrier in this case is replaced by a rotationally moving code carrier having a coded track arranged on a circular path.

Figure 6:
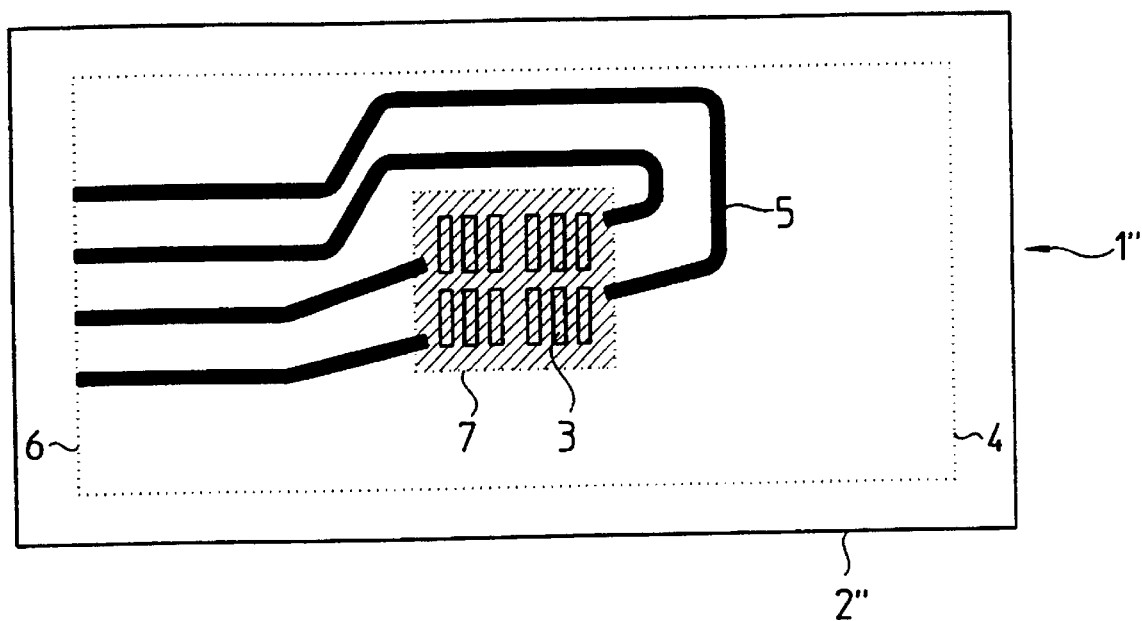
FIG. 6 is a plan view showing a projecting aperture platelet on a component, including a flip-chip assembly.
Figure 7:
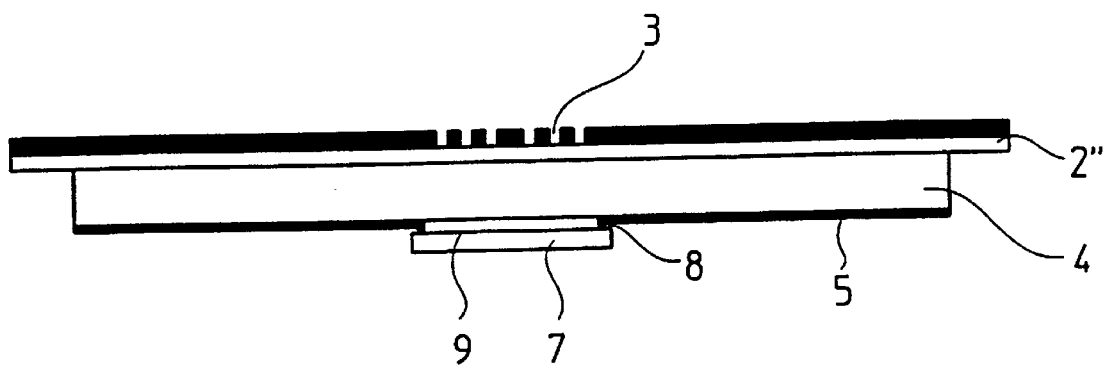
FIG. 7 is a cross-sectional view of the embodiment of FIG. 6.

Component 1" in accordance to the embodiment shown in FIGS. 6 and 7 is distinguished from component 1, in accordance with the embodiment of FIGS. 1 through 3, because the aperture platelet 2" projects laterally to some extent, around the periphery of transparent substrate 4. This configuration is beneficial to the alignment of aperture structure 3 on a code carrier. Instead of component 1, component 1" can also be used in an arrangement in accordance with FIG. 3.

What is claimed is:

1. An opto-electronic linear, angular, or rotary position encoder comprising:
   a light modulating code carrier comprising at least one coded track having adjacent light projecting and light non-projecting portions;
   an aperture structure disposed in a path of light being modulated by the code carrier; and
   a transparent substrate supporting at least one opto-electronic sensor chip facing the aperture structure, wherein the aperture structure is disposed on an aperture platelet, and the aperture platelet is joined to the substrate.

2. The device as recited in claim 1, wherein the light projecting and light non-projecting portions comprise respectively reflective and non-reflective zones.

3. The device as recited in claim 1, wherein the light projecting and light non-projecting portions comprise respectively light transmitting and non-light transmitting zones.

4. The device as recited in claim 1, wherein the aperture platelet is made of one of glass, plastic and metal.

5. The device as recited in claim 1, wherein the aperture platelet comprises one of a coating, scribe line, perforation, and machined surface forming the aperture structure.

6. The device as recited in claim 1, wherein the aperture platelet comprises at least one projection extending beyond the transparent substrate, said at least one projection having edges defining a contour of the aperture, adapted to simplify aligning the aperture structure.

7. The device as recited in claim 1, wherein the aperture platelet and the transparent substrate are joined to one another by bonding.

8. The device as recited in claim 1, wherein the aperture platelet is interchangeably joined to the transparent substrate.

9. The device as recited in claim 1, wherein the transparent substrate comprises printed conductors, and the opto-electronic sensor chip is connected at contact points to the printed conductors.

10. The device as recited in claim 1, wherein the aperture structure comprises a sequence of transparent and opaque regions.

11. The device as recited in claim 1, wherein the aperture structure comprises a phase grating.

12. The device as recited in claim 1, wherein the aperture structure is arranged on a side of the aperture platelet facing the transparent substrate.

13. The device as recited in claim 1, wherein at least one optical element is arranged in the substrate between the aperture structure and the opto-electronic sensor chip.

14. The device as recited in claim 13, wherein the optical element is a collimator lens.

15. The device as recited in claim 1, further comprising light transmitter connected to the substrate, the light transmitter having a light-emitting surface facing an aperture structure.

16. The device as recited in claim 1, further comprising a plurality of dissimilar aperture platelets, and a plurality of similar assembled structures adapted to connect the plurality of aperture platelets, said plurality of assembled structures further comprising a transparent substrate and a sensor chip arranged thereon.

* * * * *